(12) United States Patent
Pavlovitch et al.

(10) Patent No.: US 9,141,514 B1
(45) Date of Patent: Sep. 22, 2015

(54) SYSTEM, METHOD, AND COMPUTER PROGRAM FOR AUTOMATICALLY COMPARING A PLURALITY OF SOFTWARE TESTING ENVIRONMENTS

(71) Applicant: Amdocs Software Systems Limited, Dublin (IE)

(72) Inventors: Yaron Pavlovitch, Netanya (IL); Yifat Hophy, Kfar Saba (IL); Gil Sapir, Kibbutz Tzora (IL); Ami Haberer, Kibbutz Tzora (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/260,179

(22) Filed: Apr. 23, 2014

Related U.S. Application Data

(60) Provisional application No. 61/817,878, filed on May 1, 2013.

(51) Int. Cl.
*G06F 9/44* (2006.01)
*G06F 11/36* (2006.01)
(52) U.S. Cl.
CPC .................................. *G06F 11/3664* (2013.01)
(58) Field of Classification Search
CPC .................................................... G06F 11/3664
USPC ............................ 717/124–135; 714/37, 38.1
See application file for complete search history.

(56) References Cited

U.S. PATENT DOCUMENTS

| 7,810,070 | B2 * | 10/2010 | Nasuti et al. | 717/124 |
|---|---|---|---|---|
| 8,732,665 | B2 * | 5/2014 | Vedula et al. | 717/124 |
| 2002/0045436 | A1 * | 4/2002 | Ekanayake et al. | 455/406 |
| 2005/0044533 | A1 * | 2/2005 | Nesbit et al. | 717/124 |
| 2005/0228773 | A1 * | 10/2005 | Malik | 707/2 |
| 2005/0229043 | A1 * | 10/2005 | Nasuti et al. | 714/38 |
| 2009/0183143 | A1 * | 7/2009 | Li et al. | 717/126 |
| 2011/0154292 | A1 * | 6/2011 | John et al. | 717/124 |
| 2012/0272221 | A1 * | 10/2012 | Pessoa et al. | 717/127 |
| 2013/0007710 | A1 * | 1/2013 | Vedula et al. | 717/124 |
| 2013/0166515 | A1 * | 6/2013 | Kung et al. | 707/690 |

* cited by examiner

*Primary Examiner* — Qing Chen
(74) *Attorney, Agent, or Firm* — Zilka-Kotab, PC

(57) ABSTRACT

A system, method, and computer program product are provided for automatically comparing a plurality of software testing environments. In use, a plurality of software testing environments to be compared are identified. Additionally, at least one comparison validation rule to be utilized on the plurality of software testing environments is identified. Further, the plurality of software testing environments are compared utilizing the at least one comparison validation rule. Moreover, a report is generated including a result of comparing the plurality of software testing environments utilizing the at least one comparison validation rule.

16 Claims, 9 Drawing Sheets

Environment Compare Report

Summary

| | |
|---|---|
| Total Compare Rate | 63% |
| Products | CRM |
| Version | 8.1 |
| Source Environment | usccrm10@lln654 |
| Target Environment | usccrm11@lln654 |
| Show Match Ind. | false |
| Selected Validations | |

Product - CRM

Components

| | |
|---|---|
| General | Compare Rate 63% |

FIGURE 5

SYSTEM, METHOD, AND COMPUTER PROGRAM FOR AUTOMATICALLY COMPARING A PLURALITY OF SOFTWARE TESTING ENVIRONMENTS

CLAIM OF PRIORITY

This application claims the benefit of U.S. Provisional Application No. 61/817,878, filed May 1, 2013, the entire contents of which are incorporated herein by reference.

FIELD OF THE INVENTION

The present invention relates generally to testing environments in the software development industry.

BACKGROUND

Building enterprise-level software solutions is a complex endeavor that requires, among other things, building a testing environment that simulates the actual business environment in which the solution will be deployed. For example, building a Business Support System (BSS) software solution for a large telecommunication operator is a complex project. Such a solution usually involves dozens of legacy and new applications, all configured and integrated to support the provider's business processes.

Like any software, each of these components can be configured to support the business requirements of the provider, to integrate with other systems, and to be tuned in order to provide best performance. Each of these components contains the software binaries, the business requirement configuration, and deployment information. BSS systems typically include a database schema description. The combination of these five parts (binaries, database schema, deployment setup, functional configuration, nonfunctional configuration) defines a test environment, which is an entity that is required in order to test the software before its gets deployed in the production environment.

Naturally, building such a test environment is a complex task. However, the environment is also often changed during the test execution flow, which makes it even more difficult to maintain continuous functioning of the environment. There is thus a need for addressing these and/or other issues associated with the prior art.

SUMMARY

A system, method, and computer program product are provided for automatically comparing a plurality of software testing environments. In use, a plurality of software testing environments to be compared are identified. Additionally, at least one comparison validation rule to be utilized on the plurality of software testing environments is identified. Further, the plurality of software testing environments are compared utilizing the at least one comparison validation rule. Moreover, a report is generated including a result of comparing the plurality of software testing environments utilizing the at least one comparison validation rule.

BRIEF DESCRIPTION OF THE DRAWINGS

FIG. 5 illustrates an report interface for comparing a plurality of software testing environments, in accordance with one embodiment.

DETAILED DESCRIPTION

Figure 1:
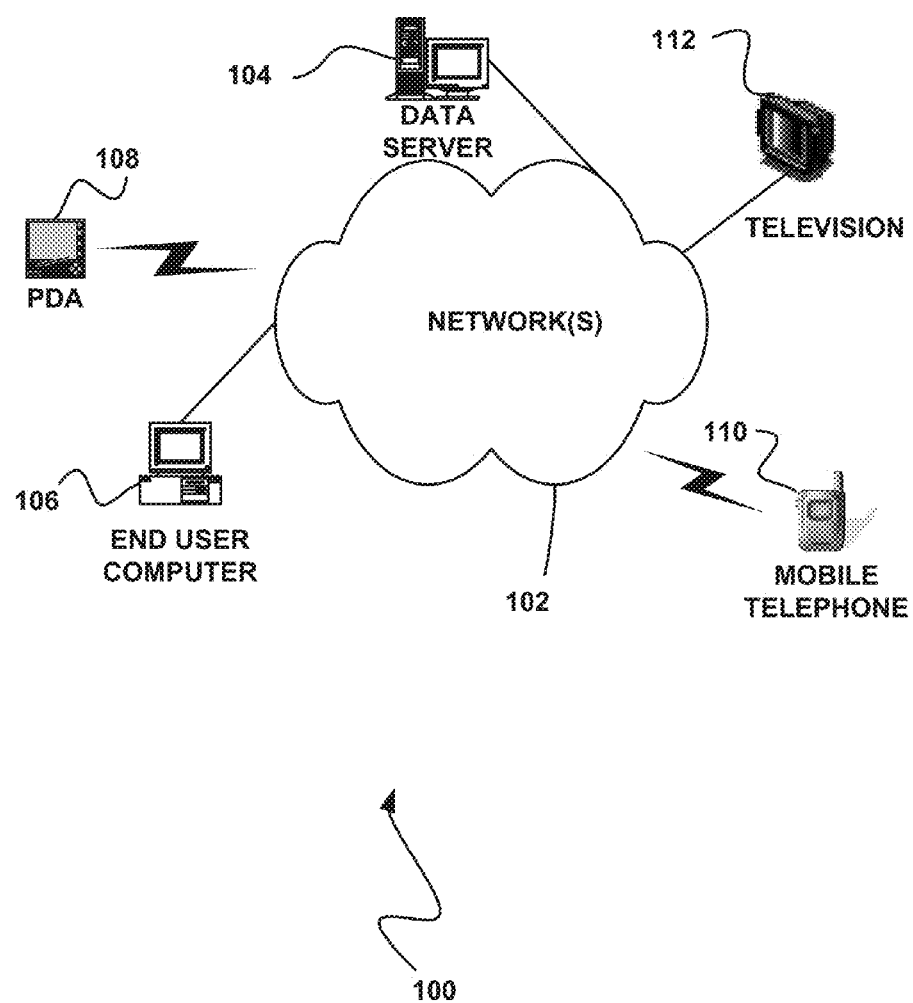
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
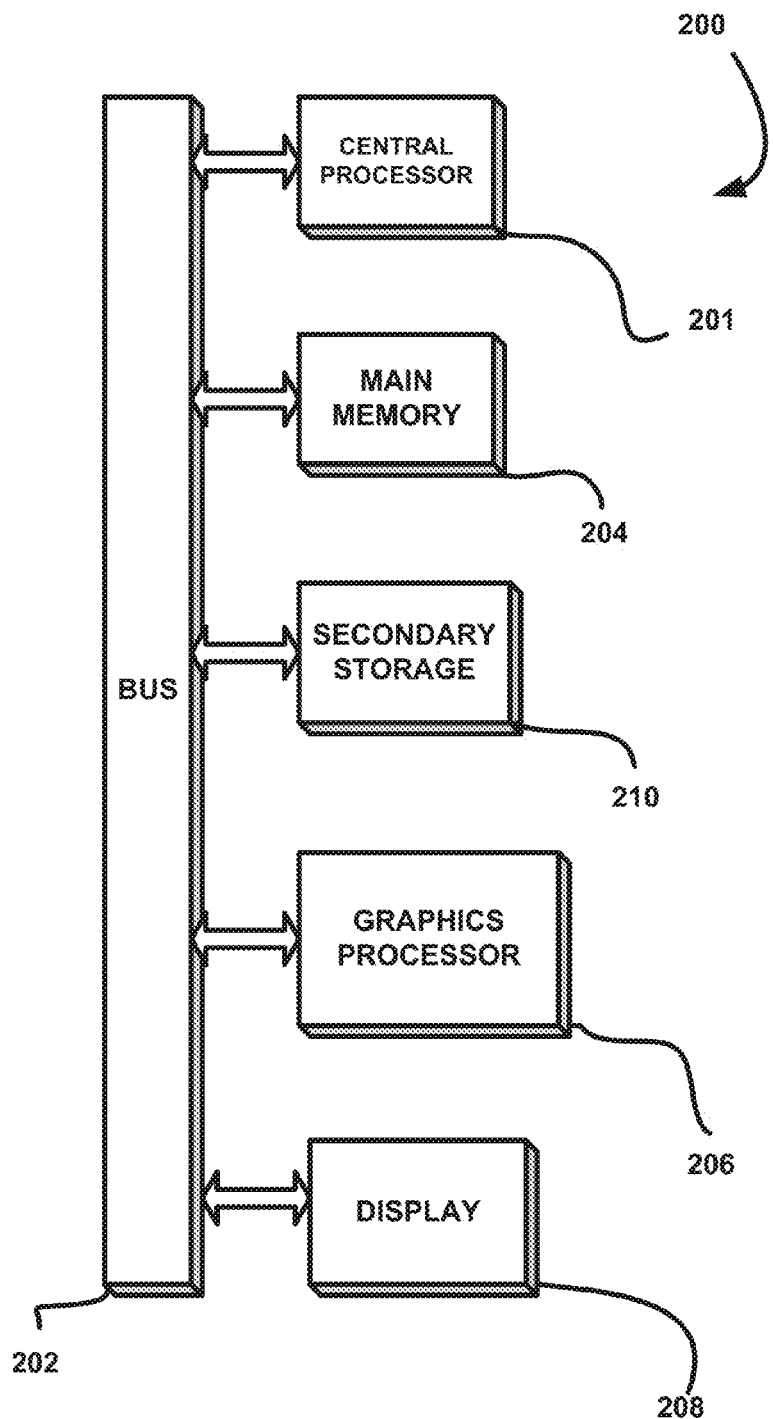
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
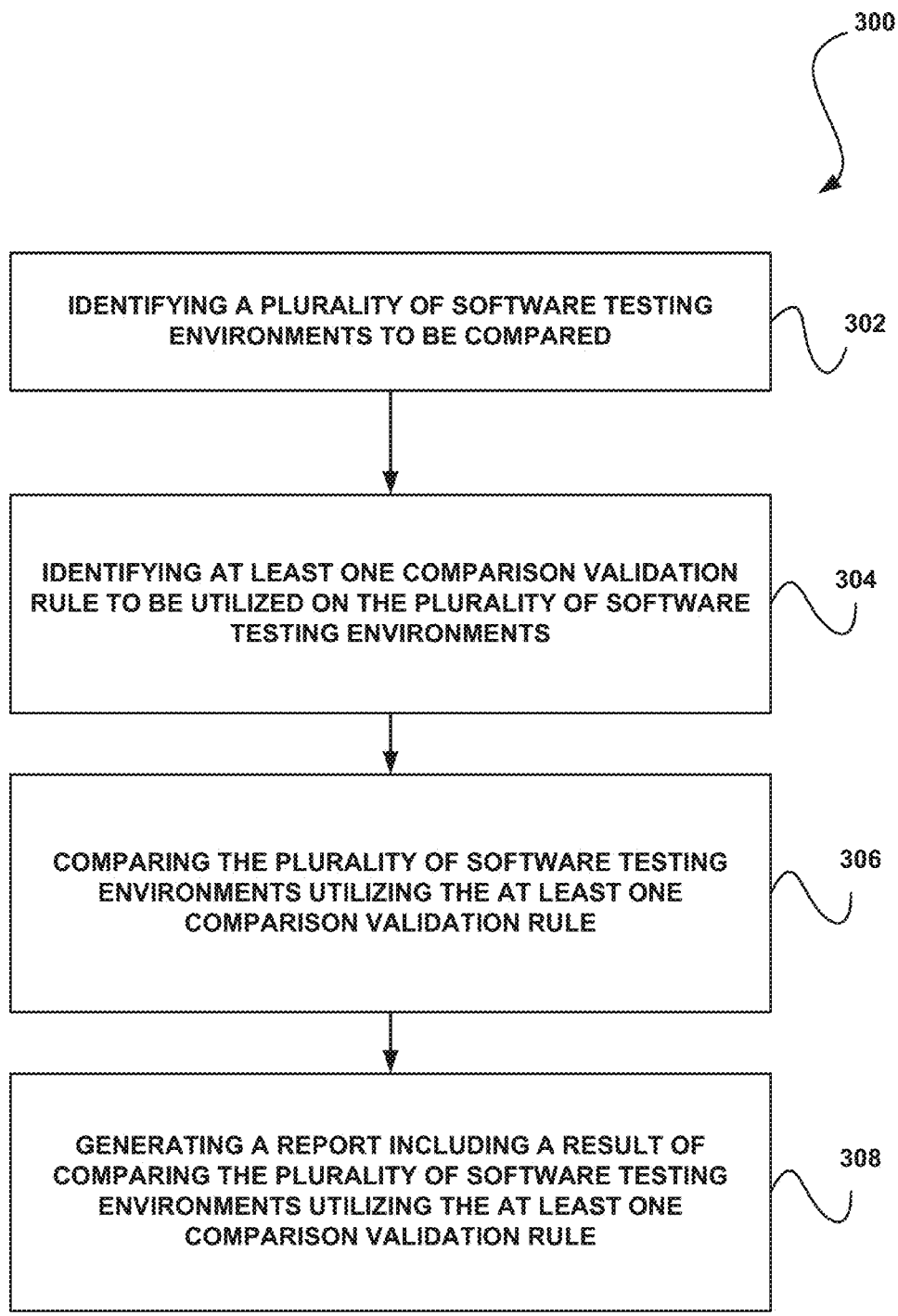
FIG. 3 illustrates a method for automatically comparing a plurality of software testing environments, in accordance with one embodiment.

FIG. 3 illustrates a method 300 for automatically comparing a plurality of software testing environments, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a plurality of software testing environments to be compared are identified. See operation 302. In one embodiment, identifying the plurality of software testing environments to be compared may include identifying the plurality of software testing environments utilizing a user interface.

The software testing environments may include any software testing environment associated with any business. For example, in one embodiment, the software testing environments may include software testing environments associated with a telecommunications provider.

Further, in one embodiment, the software testing environments may include a functional software testing environment and a non-functional software testing environment. For example, the functional software testing environment and the non-functional software testing environment may be compared to automatically determine differences, such that the non-functional software testing environment may be fixed to a functional software testing environment.

Furthermore, any number of software testing environments may be compared. For example, in one embodiment, two software testing environments may be compared. Of course, in various other embodiments, three or four, etc. software environments may be compared.

Additionally, at least one comparison validation rule to be utilized on the plurality of software testing environments is identified. See operation 304. The comparison validation rule may include any rule associated with comparing the software testing environments.

For example, in one embodiment, the comparison validation rule may include a rule determining whether one or more components exist in the software testing environments. These components may include any component, such as a file, a database, a table, variables, etc. In various other embodiments, the comparison validation rule may include verifying a database table existence, verifying a database table structure, verifying database table data, verifying file system directories' content, verifying file system directories' existence, verifying values, verifying software deployment, verifying specific files, and/or any other type of rule (e.g. as defined by a user, etc.).

The comparison validation rules to be utilized on the plurality of software testing environments may be identified in various ways. For example, in one embodiment, identifying the at least one comparison validation rule to be utilized on the plurality of software testing environments may include generating the at least one comparison validation rule. In one embodiment, generating the at least one comparison validation rule may include generating the at least one comparison validation rule utilizing a graphical user interface (GUI).

Additionally, in one embodiment, generating the at least one comparison validation rule may include generating the at least one comparison validation rule utilizing a proprietary logic language. Of course, in various embodiments, the rules may be defined utilizing a variety of programming languages capable of defining rules.

Further, in one embodiment, identifying the at least one comparison validation rule to be utilized on the plurality of software testing environments may include retrieving a list of comparison validation rules. In this case, rules that are relevant to the plurality of software testing environments may be selected from the list of comparison validation rules (e.g. such that the at least one comparison validation rule includes the rules that are relevant to the plurality of software testing environments).

As shown further in FIG. 3, the plurality of software testing environments are compared utilizing the at least one comparison validation rule. See operation 306. Moreover, a report is generated including a result of comparing the plurality of software testing environments utilizing the at least one comparison validation rule. See operation 308. In this case, comparing the plurality of software testing environments utilizing the at least one comparison validation rule may include applying the at least one comparison validation rule to the plurality of software testing environments.

The report generated may include a variety of information associated with the comparison. For example, in one embodiment, generating the report including the result of comparing the plurality of software testing environments utilizing the at least one comparison validation rule may include generating a report that shows differences in the plurality of software testing environments.

In another embodiment, generating the report including the result of comparing the plurality of software testing environments utilizing the at least one comparison validation rule may include generating a hierarchical presentation model including a detailed itemized score associated with each of the plurality of software testing environments. The score may be based on the rules, for example. Additionally, generating the report including the result of comparing the plurality of software testing environments utilizing the at least one comparison validation rule may include generating an overall comparison score associated with each of the plurality of software testing environments.

In one embodiment, a weight may be assigned to the comparison validation rules to be utilized on the plurality of software testing environments. The weight may include any value capable of being used to scale or weight a value associated with at least one comparison validation rule. In this way, a user may determine how much emphasis to put on specific rules. Furthermore, the overall comparison score associated with each of the plurality of software testing environments may be weighted, based on the weight assigned to the at least one comparison validation rule.

Still yet, in one embodiment, identifying the at least one comparison validation rule to be utilized on the plurality of software testing environments may include creating one or more validation rules, where the one or more validation rules are operative to automatically validate at least one parameter associated with at least two software testing environments of the plurality of software testing environments. The parameters may include any type of parameter associated with the software testing environments.

Further, the one or more validation rules may be associated with each product of a plurality of products being tested in a corresponding one of the at least two software testing environments. In this case, for each product of the plurality of products being tested in the corresponding one of the at least two software testing environments, a subset of the at least one parameter may be automatically validated by employing the one or more validation rules associated therewith. Furthermore, in one embodiment, the plurality of software testing environments may be compared utilizing the at least one comparison validation rule includes automatically comparing results of validating the subset of the at least one parameter between each product of the plurality of products.

In this case, a product represents a runtime application that is deployed in the test environment. In one embodiment, at design time, each product may be associated with all the relevant validation rules that are set by a designer. As an option, the associating may be hierarchical. Therefore, if the association is done at a higher level of the validation tree, all the subtree validations may be marked as relevant for that product.

In one embodiment, comparing the software testing environments may include comparing a plurality of objects associated with the plurality of software testing environments. In this case, the plurality of objects may include any type of object including files, databases, operating system items (e.g. a Unix item, etc.), and/or any customization. In other words, in various embodiments, the testing environments as a whole may be compared and/or the objects in the testing environments may be compared.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
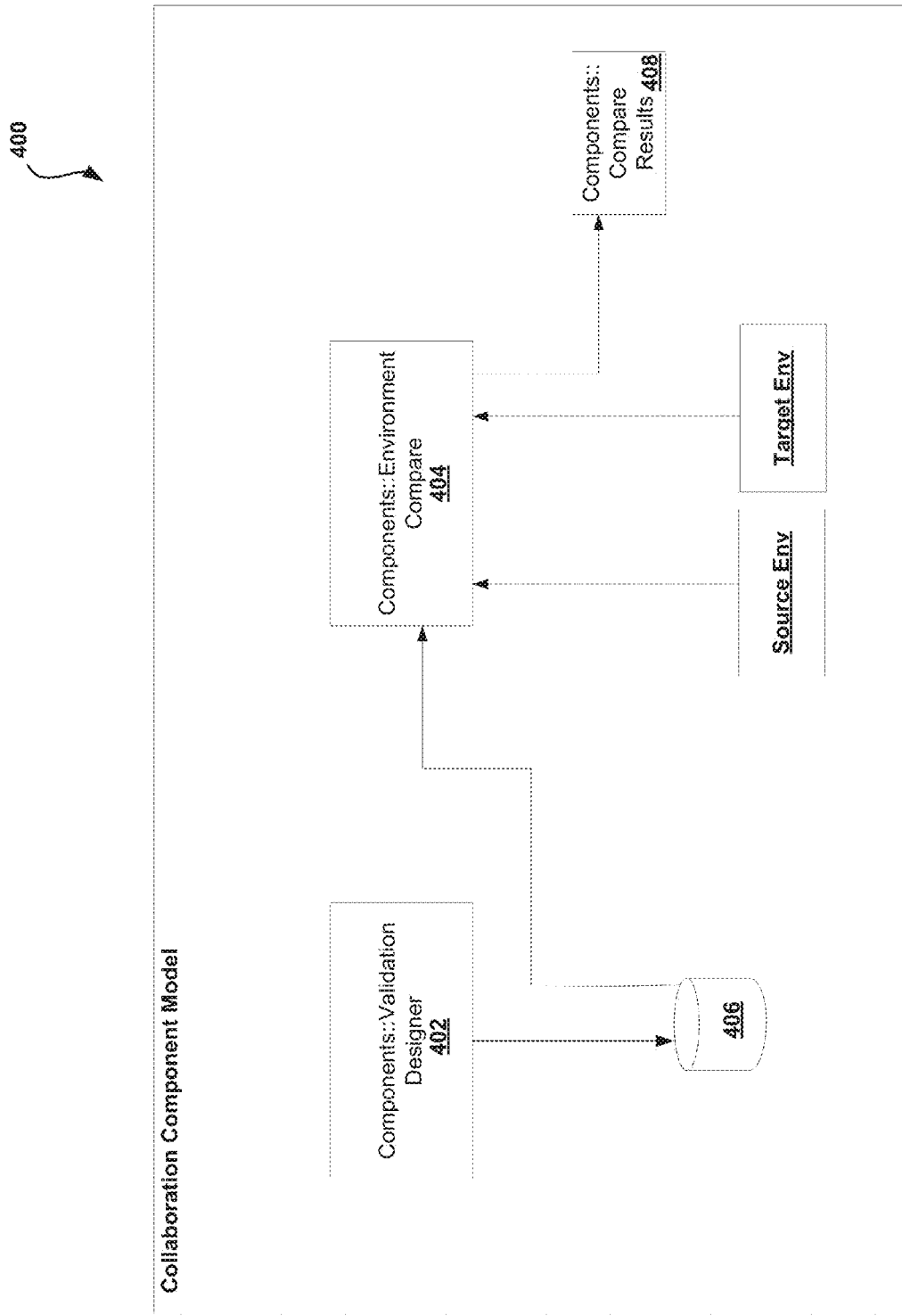
FIG. 4 illustrates a system for automatically comparing a plurality of software testing environments, in accordance with one embodiment.

FIG. 4 illustrates a system 400 for automatically comparing a plurality of software testing environments, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

In operation, the system 400 may function to support a high level detailed comparison of two or more test environments. As shown, the system 400 includes a validation designer component 402, which comprises a comparison validation rule definition language and tool. The system 400 further includes an environment comparison tool 404, which provides a runtime environment for executing any set of comparison validation rules on actual test environments.

Figure 8:
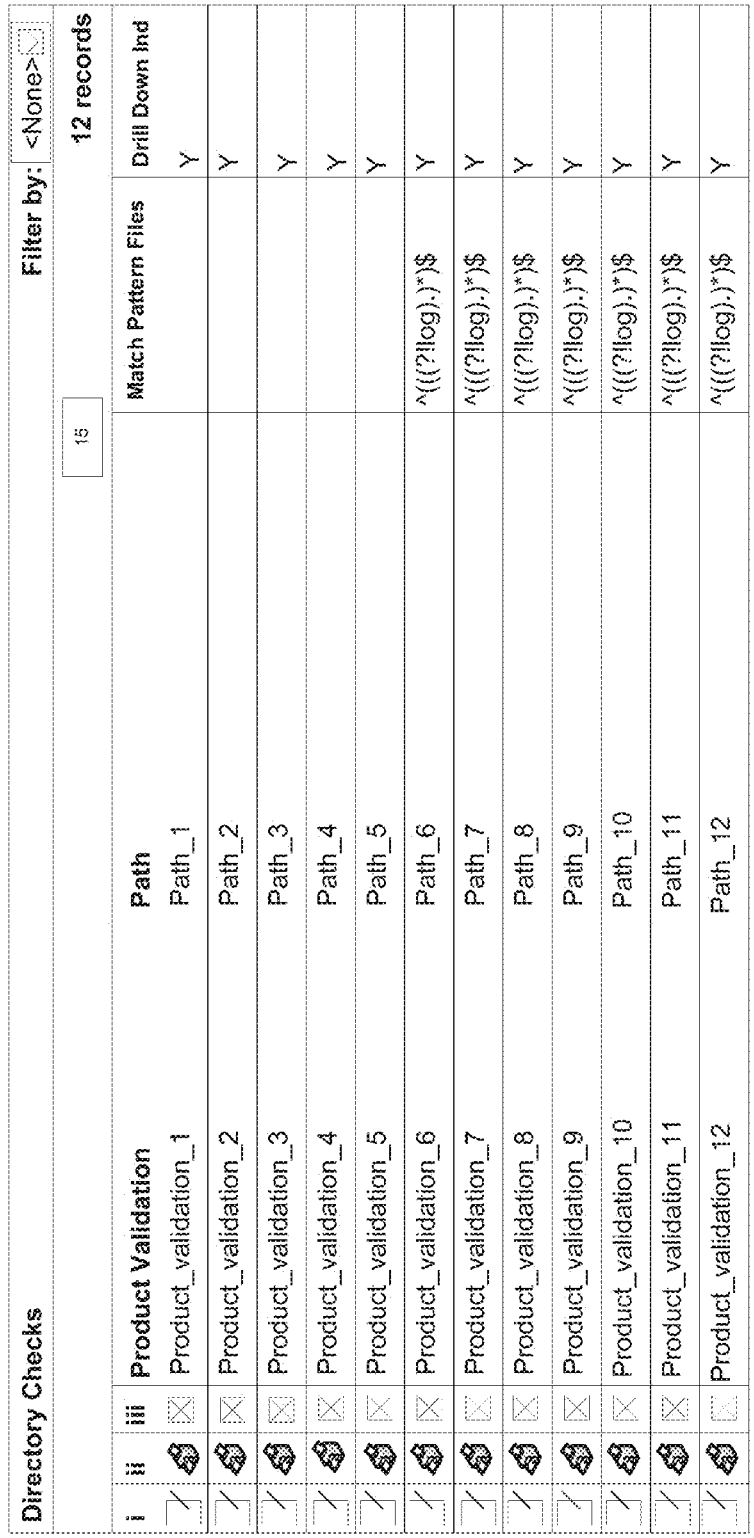
FIG. 8 illustrates an interface for defining comparison validation rules, in accordance with one embodiment.

In one embodiment, the validation designer component 402 may allow a validation designer to define a comparison validation rule in a proprietary logic language using a GUI application (e.g. such as the GUI illustrated in FIG. 8, etc.). The environment comparison tool 404 may serve an environment owner who wishes to compare the environment to one or more other environments.

The environment comparison tool 404 may retrieve a list of validation rules from the designer component 402 (or, in one embodiment, a rules repository 406, etc.) and allow instantiation of the rules for any test environment available. Once the environment is selected, an execution component may verify that only rules relevant to the particular environment are available for selection and execution.

After the compare is executed, a detailed report 408 depicting differences in the testing environments is produced. In one embodiment, the execution component may support online viewing of the report 408. Further, in one embodiment, when presenting the report 408, a hierarchical presentation model may be built. As an option, the report 408 may include a detailed itemized score as well as an overall compare score, which takes into consideration the number of differences found between the environments and a predefined weight of each object in the calculation. An object may be, for example, a file or a database table, etc.

In one embodiment, each validation rule may receive a weight of 100% by default. In this case, the weight may be raised or lowered by the designer. For example, the designer may decide that a specific file is extremely important and therefore the rule for this file will receive a weight of 200%, and hence will have a double impact on the final score.

In one embodiment, the validation designer component 402 and the environment comparison tool 404 may interact via a database that stores all the validation rules (the rules repository 406 in FIG. 4).

Figure 6:
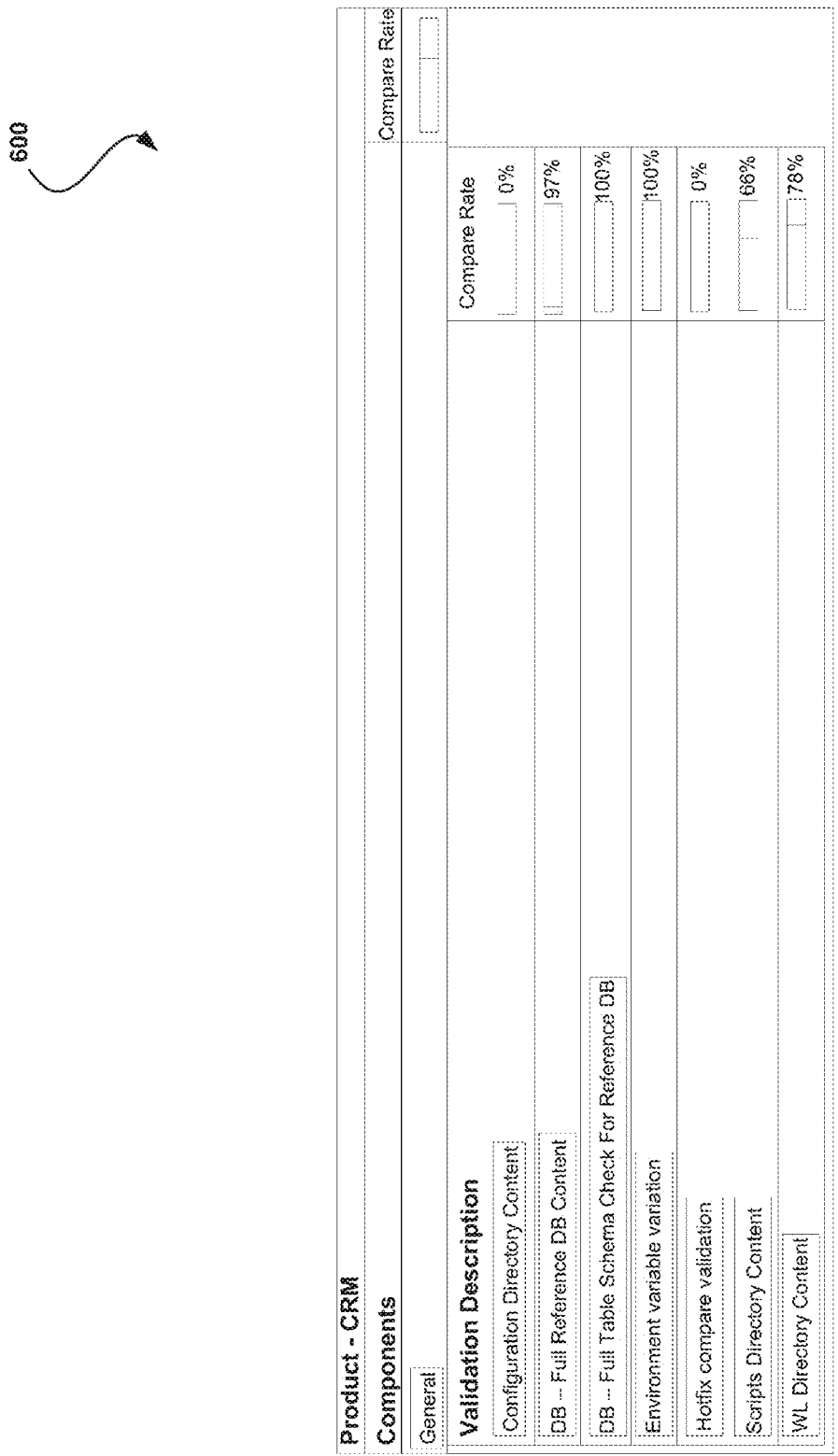
FIG. 6 illustrates an report interface for comparing a plurality of software testing environments, in accordance with one embodiment.
Figure 7:
FIG. 7 illustrates an report interface for comparing a plurality of software testing environments, in accordance with one embodiment.

FIGS. 5-7 illustrate examples of comparison results and scores, in accordance with various embodiments.

FIG. 5 illustrates an report interface 500 for comparing a plurality of software testing environments, in accordance with one embodiment. As an option, the interface 500 may be implemented in the context of the details of FIGS. 1-4. Of course, however, the interface 500 may be implemented in the context of any desired environment. Further, the aforementioned definitions may equally apply to the description below.

As shown, the report interface 500 illustrates an online comparison summary report. In one embodiment, the compare requestor may zoom-in utilizing the interface 500 to see where the differences are between testing environments.

FIG. 6 illustrates an report interface 600 for comparing a plurality of software testing environments, in accordance with one embodiment. As an option, the interface 600 may be implemented in the context of the details of FIGS. 1-5. Of course, however, the interface 600 may be implemented in the context of any desired environment. Further, the aforementioned definitions may equally apply to the description below.

As shown, the interface 600 illustrates detailed compare results capable of being presented online. In this case, the comparison breakdown is per testing system and validation type.

FIG. 7 illustrates an report interface 700 for comparing a plurality of software testing environments, in accordance with one embodiment. As an option, the interface 700 may be implemented in the context of the details of FIGS. 1-6. Of course, however, the interface 700 may be implemented in the context of any desired environment. Further, the aforementioned definitions may equally apply to the description below.

As shown, the interface 700 shows detailed compare results presented online, per specific validation type. This example shows a difference in the hot fixes deployment (software binaries) between the source and the target environments.

FIG. 8 illustrates an interface 800 for defining comparison validation rules, in accordance with one embodiment. As an option, the interface 800 may be implemented in the context of the details of FIGS. 1-7. Of course, however, the interface 800 may be implemented in the context of any desired environment. Further, the aforementioned definitions may equally apply to the description below.

As shown, FIG. 8 presents how a rule to compare two file directories may be defined dynamically. In one embodiment, the rule may be based on a predefined directory check validation class that has the knowledge of comparing file system directories and well a defined interface. Various validation classes may be present that may be utilized by the validation designer.

Figure 9:
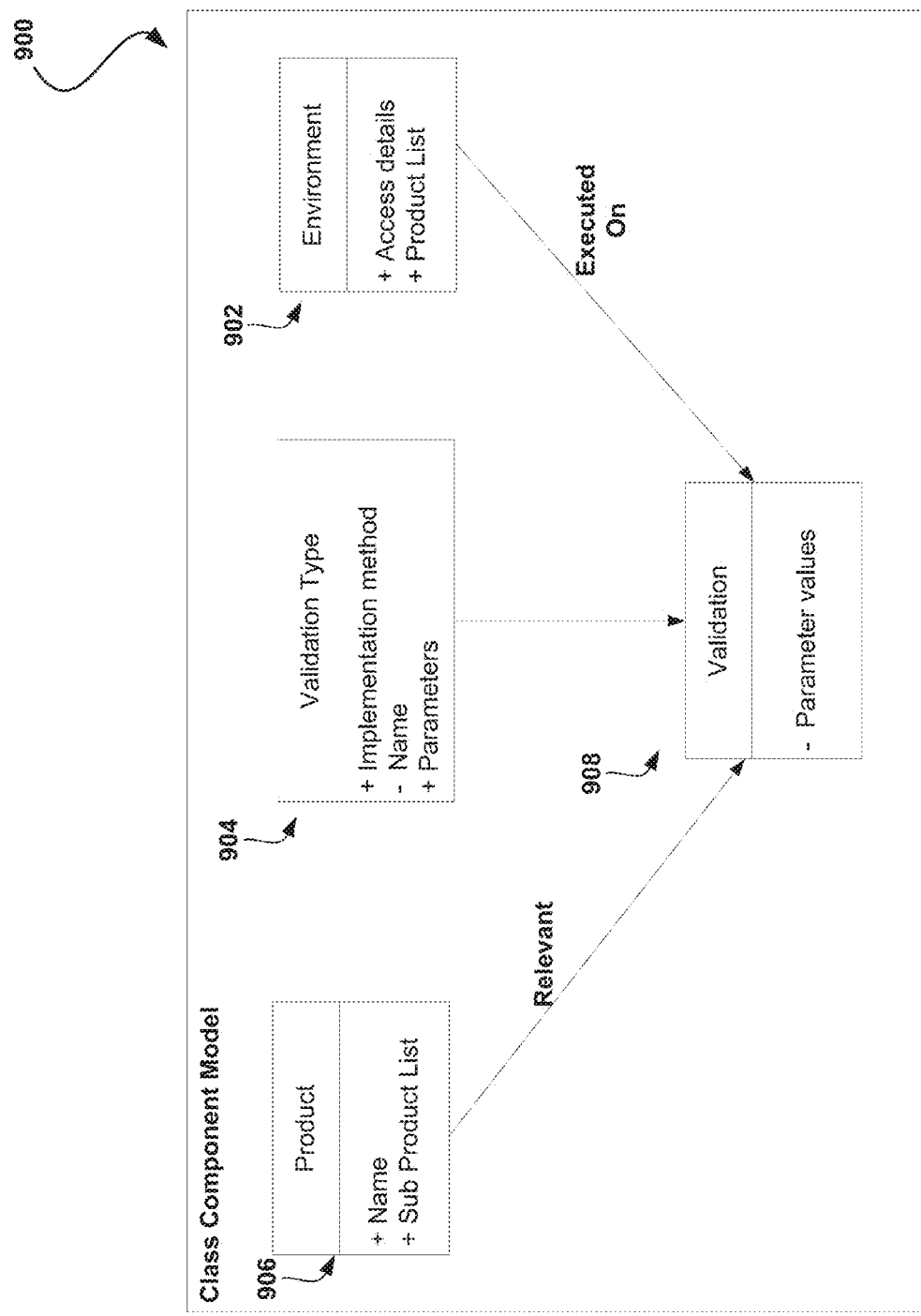
FIG. 9 illustrates component model of a system for comparing a plurality of software testing environments, in accordance with one embodiment.

FIG. 9 illustrates component model 900 of a system for comparing a plurality of software testing environments, in accordance with one embodiment. As an option, the component model 900 may be implemented in the context of the details of FIGS. 1-8. Of course, however, the component model 900 may be implemented in the context of any desired environment. Further, the aforementioned definitions may equally apply to the description below.

FIG. 9 depicts entities that may comprise a system for comparing a plurality of software testing environments. The model 900 includes an environment 902 including a set of attributes representing the details of the environment access and content. In various embodiments, the environment 902 may be predefined at design time, or may be created dynamically by retrieving access parameters during execution from the executing component.

The model 900 further includes a validation type 904 including a validation template to be executed in a test environment. In various embodiments, the template type may define what needs to be validated, how it needs to be validated, and information about instantiation parameters.

For example, "Check Environment variables Existence" may be a validation type that verifies a variable is assigned a value in instantiation. Additional examples of validation types may include Database Table Existence, Database Tables structure, Database Table Data, File System Directories Content, File System Directories Existence, Values of predefined Unix Variable, Software Hotfix Deployment, and/or various other validation types.

Validation 908 is an instantiation of a validation type that is associated with one or more products and may include instantiation values, where applicable. For example, "Check ABP Environment variables Existence" may use the value ABP* as a filter. Such a validation may compare the values of all environment variables that starts with 'ABP' in sets of given test environments The model 900 further includes a product 906 that represents a runtime application that is deployed in the test environment. At design time, each product may be associated with all the relevant validation rules that are set by the designer. In one embodiment, the associating may be hierarchical. Therefore, if the association is done at a higher level of the validation tree, all the subtree validations may be marked as relevant for that product. The product entity may be a hierarchy that contains upper level products and optional sets of components per product for fine tuning of the validation in component level. In one embodiment, the hierarchy depth may be unlimited.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium comprising:
   computer code configured to identify a plurality of software testing environments to be compared;
   computer code configured to identify at least one comparison validation rule to be utilized on the plurality of software testing environments;
   computer code configured to assign a weight to the at least one comparison validation rule to be utilized on the plurality of software testing environments;
   computer code configured to compare the plurality of software testing environments utilizing the at least one comparison validation rule; and
   computer code configured to generate a report including a result of comparing the plurality of software testing environments utilizing the at least one comparison validation rule, including:
      generating a hierarchical presentation model including a detailed itemized score associated with each of the plurality of software testing environments,
      generating an overall comparison score associated with each of the plurality of software testing environments, and
      weighting the overall comparison score associated with each of the plurality of software testing environments, based on the weight assigned to the at least one comparison validation rule.

2. The computer program product of claim 1, wherein the computer program product is operable such that identifying the plurality of software testing environments to be compared includes identifying the plurality of software testing environments utilizing a user interface.

3. The computer program product of claim 1, wherein the computer program product is operable such that identifying the at least one comparison validation rule to be utilized on the plurality of software testing environments includes generating the at least one comparison validation rule.

4. The computer program product of claim 3, wherein the computer program product is operable such that generating the at least one comparison validation rule includes generating the at least one comparison validation rule utilizing a graphical user interface.

5. The computer program product of claim 3, wherein the computer program product is operable such that generating the at least one comparison validation rule includes generating the at least one comparison validation rule utilizing a proprietary logic language.

6. The computer program product of claim 1, wherein the computer program product is operable such that identifying the at least one comparison validation rule to be utilized on the plurality of software testing environments includes retrieving a list of comparison validation rules.

7. The computer program product of claim 6, further comprising computer code configured to select rules that are relevant to the plurality of software testing environments from the list of comparison validation rules.

8. The computer program product of claim 7, wherein the computer program product is operable such that the list of comparison validation rules includes the rules that are relevant to the plurality of software testing environments.

9. The computer program product of claim 1, wherein the computer program product is operable such that comparing the plurality of software testing environments utilizing the at least one comparison validation rule includes applying the at least one comparison validation rule to the plurality of software testing environments.

10. The computer program product of claim 1, wherein the computer program product is operable such that generating the report including the result of comparing the plurality of software testing environments utilizing the at least one comparison validation rule includes generating a report that shows differences in the plurality of software testing environments.

11. The computer program product of claim 1, wherein the computer program product is operable such that identifying the at least one comparison validation rule to be utilized on the plurality of software testing environments includes creating one or more validation rules, the one or more validation rules being operative to automatically validate at least one parameter associated with at least two software testing environments of the plurality of software testing environments.

12. The computer program product of claim 11, further comprising computer code configured to associate the one or more validation rules to each product of a plurality of products being tested in a corresponding one of the at least two software testing environments.

13. The computer program product of claim 12, further comprising computer code configured to, for each product of the plurality of products being tested in the corresponding one of the at least two software testing environments, automatically validate a subset of the at least one parameter by employing the one or more validation rules associated therewith.

14. The computer program product of claim 1, wherein the computer program product is operable such that comparing the plurality of software testing environments utilizing the at least one comparison validation rule includes including a plurality of objects associated with the plurality of software testing environments, the plurality of objects including at least one file, database, or operating system item.

15. A method comprising:
   identifying a plurality of software testing environments to be compared;
   identifying at least one comparison validation rule to be utilized on the plurality of software testing environments;
   assigning a weight to the at least one comparison validation rule to be utilized on the plurality of software testing environments;
   comparing the plurality of software testing environments utilizing the at least one comparison validation rule; and
   generating a report including a result of comparing the plurality of software testing environments utilizing the at least one comparison validation rule, including:
      generating, by a hardware processor, a hierarchical presentation model including a detailed itemized score associated with each of the plurality of software testing environments,
      generating, by the hardware processor, an overall comparison score associated with each of the plurality of software testing environments, and
      weighting, by the hardware processor, the overall comparison score associated with each of the plurality of software testing environments, based on the weight assigned to the at least one comparison validation rule.

16. A system comprising:
a memory system; and
one or more processing cores coupled to the memory system and that are each configured to:
   identify a plurality of software testing environments to be compared;
   identify at least one comparison validation rule to be utilized on the plurality of software testing environments;
   assign a weight to the at least one comparison validation rule to be utilized on the plurality of software testing environments;
   compare the plurality of software testing environments utilizing the at least one comparison validation rule; and
   generate a report including a result of comparing the plurality of software testing environments utilizing the at least one comparison validation rule, including:
      generating a hierarchical presentation model including a detailed itemized score associated with each of the plurality of software testing environments,
      generating an overall comparison score associated with each of the plurality of software testing environments, and
      weighting the overall comparison score associated with each of the plurality of software testing environments, based on the weight assigned to the at least one comparison validation rule.

* * * * *